United States Patent [19]

Wynosky et al.

[11] 4,295,611
[45] Oct. 20, 1981

[54] TWO-DIMENSIONAL NOZZLE

[75] Inventors: Thomas A. Wynosky, Madison, Conn.; Charles A. Campbell, Palm Beach Gardens, Fla.

[73] Assignee: United Technologies Corporation, Hartford, Conn.

[21] Appl. No.: 968,598

[22] Filed: Dec. 11, 1978

[51] Int. Cl.³ .............................................. F02K 1/10
[52] U.S. Cl. .............................................. 239/265.37
[58] Field of Search ............... 239/265.19, 265.33, 239/265.37, 265.39, 265.41, 265.43; 60/230

[56] References Cited

U.S. PATENT DOCUMENTS 3,049,875  8/1962  Horgan .................. 239/265.39 X
4,088,270  5/1978  Maiden .................. 239/265.33 X Primary Examiner—Robert W. Saifer
Attorney, Agent, or Firm—Norman Friedland

[57] ABSTRACT

A cooperating flap moveable axially and radially and a collapsible plug in a two-dimensional nozzle for aircraft powered by a gas turbine engine serves to maximize nozzle performance for subsonic, supersonic and speeds therebetween.

3 Claims, 2 Drawing Figures

TWO-DIMENSIONAL NOZZLE

BACKGROUND OF THE INVENTION

This invention relates to two-dimensional nozzles for aircraft powered by a gas turbine engine and particularly to means for changing the nozzle geometry.

As is well known two-dimensional nozzles are achieving greater attention in the aircraft art particularly because of their inherent ability to integrate into aircraft shapes, their ability to deflect engine exhaust to achieve vectoring capabilities and their ability to induce super circulation about the airframe to produce additional lift.

It is further well known that optimum performance for subsonic conditions of a two-dimensional nozzle is attained by having the throat of a plug nozzle at the exit of the nozzle flaps and having the throat inclined at an angle nearly perpendicular to this plug surface. Further, it is desirable to hold the plug angle at a moderately high value, say 15° thus, the throat angle contributes to gains in subsonic performance.

Equally well known to one skilled in the art is that for supersonic condition, optimum performance requires that the throat be located within the nozzle flap and inclined at an angle that is significantly larger than perpendicular to the plug. We have found that we can obtain optimum subsonic and supersonic conditions by employing a collapsing plug to size the throat area and maintain engine match. The plug dimensions allow for jet area control from dry through maximum afterburning operation at both subsonic and supersonic operation. A translating/rotating flap is used to achieve the optimum performance shape at both subsonic and supersonic flight. Flap motion is achieved by controlling the flap orientation with a contoured track which guides two rollers attached to the nozzle flap.

SUMMARY OF THE INVENTION

A feature of this invention is to provide for a variable geometry two-dimensional nozzle for aircraft powered by a gas turbine engine, means for varying the throat area and throat location with respect to the nozzle exit plane. The center body or plug is made collapsible to size the throat area and the cooperating flap is made to move rectilinearly and rotationally to achieve an optimum configuration for subsonic and supersonic flight conditions. A contoured cam track is utilized to guide roller means attached to the flap for achieving the translating and rotary motion.

Other features and advantages will be apparent from the specification and claims and from the accompanying drawings which illustrate an embodiment of the invention.

DESCRIPTION OF THE PREFERRED EMBODIMENT

While the invention is shown in schematic form it is to be understood that the detailed mechanisms are well known devices and for some of the detail construction reference should be made to U.S. Pat. No. 3,774,868 granted to G. F. Goetz on Nov. 27, 1973 and U.S. Pat. No. 4,093,157 granted on June 6, 1978 to R. B. Cavanagh and D. K. Jan, the latter of which is assigned to the same assignee as this patent application. Actuators for collapsing the plug and positioning the flap are all well known and commercially available.

Figure 1:
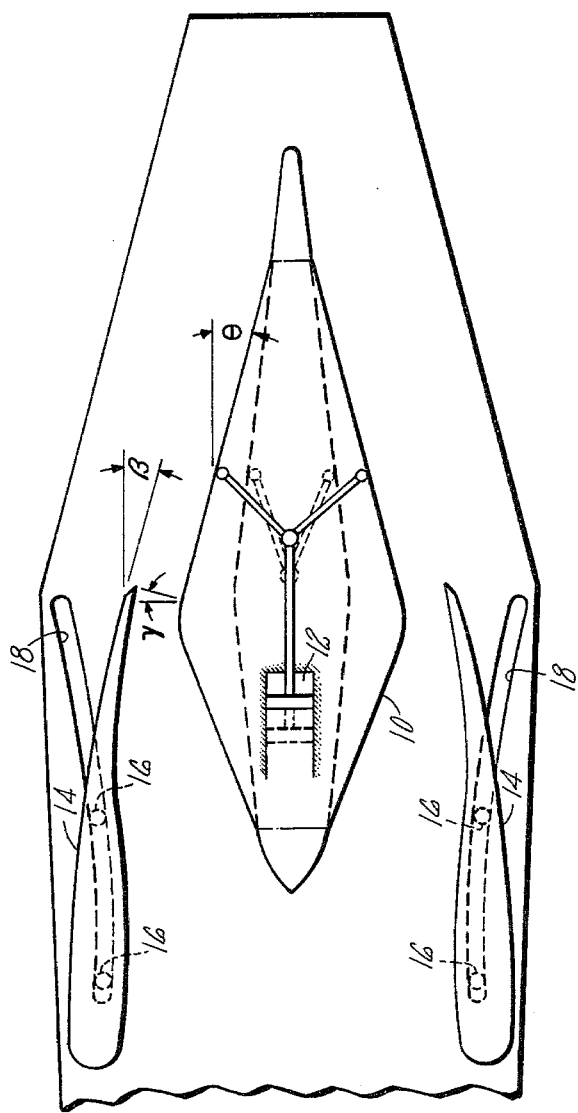
FIG. 1 is a schematic view of this invention with the flap/plug nozzle shown in the subsonic configuration.

As can be seen from FIG. 1, the center body or nozzle plug is collapsible and is shown in its deployed position. The actuator 12 serves to move the articulated walls (shown schematically) to adjust the area between the nozzle flap 14 and the outer surface of plug 10. In this configuration the throat angle $\gamma$ is nearly perpendicular and the exit plane of flap 14 is coincidental relative to the throat. This achieves an optimum subsonic performance.

Figure 2:
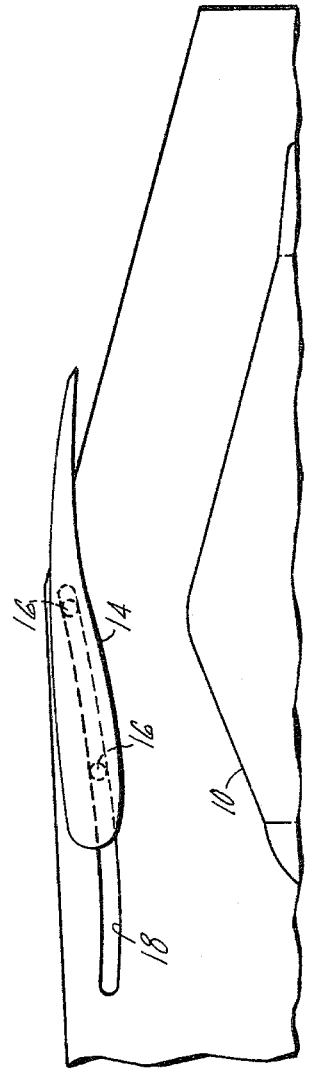
FIG. 2 is a schematic view of this invention with the flap plug nozzle shown in the supersonic configuration.

By deploying the flap 14 which is guided by attached rollers 16 in cam slot 18 formed in the adjacent wall of the two-dimensional nozzle the configuration can be optimized for supersonic conditions. As noted in FIG. 2 the flap 14 is translated downstream with respect to the engine exhaust flow in the nozzle which owing to this cam slot 18 translates and rotates the nozzle flap 14. This causes the throat to move inside the nozzle flap and achieves a throat inclination angle which is significantly larger than perpendicular to the plug surface.

By varying the area of the throat by virtue of collapsing and expanding plug 10, the nozzle can be adapted to accommodate an augmentor for achieving good augmenting for both subsonic and supersonic conditions.

It should be understood that the invention is not limited to the particular embodiments shown and described herein, but that various changes and modifications may be made without departing from the spirit and scope of this novel concept as defined by the following claims.

We claim:

1. A two-dimensional exhaust nozzle construction for aircraft powered by a turbine type power plant receiving the fluid working medium exhausting in the ambient, a collapsible plug centrally mounted in said two-dimensional nozzle, at least one flap adjacent said nozzle and in spaced relationship defining a wall of said two-dimensional nozzle, said flap being a rigid member and said flap and said plug defining a passageway for conducting the fluid in said two-dimensional nozzle exhausting to ambient, said flap and said plug defining a throat angle and (throat are in the passageway, said flap movable in concomitant radial and axial directions to define a first geometry for optimizing the exhaust stream in a subsonic condition by making the throat angle substantially perpendicular at the exit of said flap relative to the plug surface and a second geometry for optimizing the exhaust stream in a supersonic condition by moving the throat within the flap and having its angle greater than the perpendicular relative to the plug surface, and means for scheduling the throat angle and throat area independent of each other.

2. A two-dimensional exhaust nozzle as in claim 1 including an adjacent wall perpendicular to the flap, a contoured cam slot in said adjacent wall defining a cam track to position said flap in the desired positions so as to vary both exit area and throat area independently, and connecting means interconnecting said flap and said cam slot.

3. A two-dimensional nozzle as in claim 2 including means for positioning at least one wall surface of said plug to vary the area of said passageway formed between said plug and said flap.

* * * * *